United States Patent [19]

Abbott et al.

[11] Patent Number: 4,922,790
[45] Date of Patent: May 8, 1990

[54] DYNAMIC PHASE ADJUSTER

[76] Inventors: Harold F. Abbott, 193 Millen Road, Stoney Creek, Ontario, Canada, L8E-2G4; Alfred H. Abbott, 3821 Robinson Vail Rd., Franklin, Ohio 45005

[21] Appl. No.: 149,172

[22] Filed: Jan. 27, 1988

[51] Int. Cl.⁵ .................. F16H 57/10; F16H 35/06
[52] U.S. Cl. .................................. 475/271; 74/395; 475/323; 475/341; 475/902
[58] Field of Search ............ 74/789, 793, 773, 750 R, 74/752 B, 803, 682, 770, 395

[56] References Cited

U.S. PATENT DOCUMENTS

| | | | |
|---|---|---|---|
| 1,299,765 | 4/1919 | Norton et al. | 74/750 R |
| 2,041,446 | 5/1936 | Wharton | 74/770 |
| 2,218,838 | 10/1940 | Alspaugh | 74/750 R |
| 2,536,102 | 1/1951 | Smith | 74/395 |
| 2,700,903 | 2/1955 | Bohme | 74/395 |
| 2,986,952 | 6/1961 | Ward, Jr. | 74/675 |
| 3,079,813 | 3/1963 | Quigley | 74/682 |
| 3,228,261 | 1/1966 | Puls et al. | 74/789 |
| 3,482,457 | 12/1969 | Wallis | 74/675 |
| 3,705,522 | 12/1972 | Ogawa | 74/803 |
| 3,812,734 | 5/1974 | Hamburger | 474/144 |
| 4,155,275 | 5/1979 | Devanney | 74/789 |
| 4,458,555 | 7/1984 | Holtzberg et al. | 74/579 E |
| 4,579,019 | 4/1986 | Gabriele | 74/682 |

Primary Examiner—Dirk Wright
Attorney, Agent, or Firm—Timothy T. Patula

[57] ABSTRACT

A device for altering the angular relationship between input and output components of a device includes an outer housing, an inner housing disposed within the outer housing for coaxial rotation therein, a rotational energy input component engaging the inner housing through the outer housing, a rotational energy output engaging the inner housing through the outer housing at an angular position relative to the rotational energy input, the inner housing including first and second planetary gear sets in a gear carrier for transferring energy from the first set of planetary gears to the second set of planetary gears, the first set of gears being connected to the input, the second set of gears being connected to the output, a braking device for controlling the rotation of the inner housing relative to the outer housing to permit the adjustment of the rotational energy input component relative to the rotational energy output component, and a mechanism for adjusting the relative angular position of the input component to the output component.

20 Claims, 8 Drawing Sheets

FIG_5

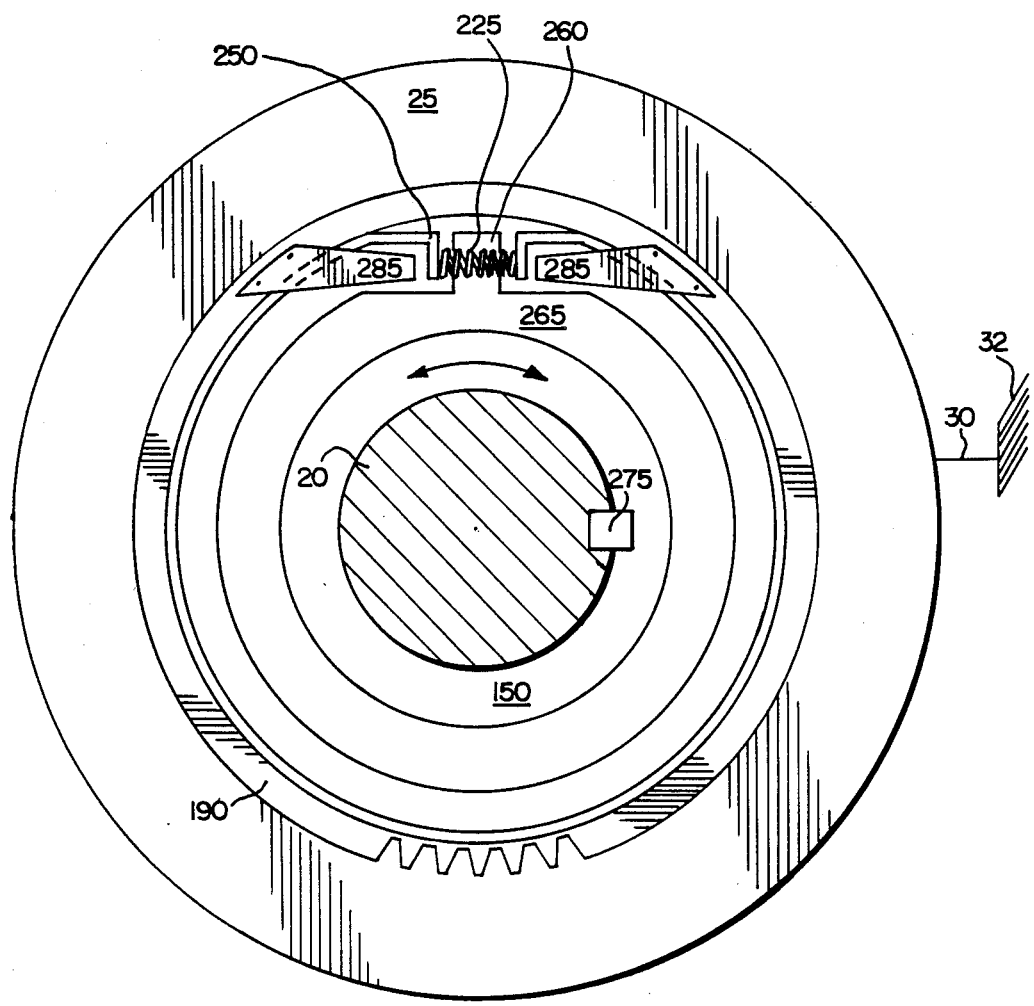

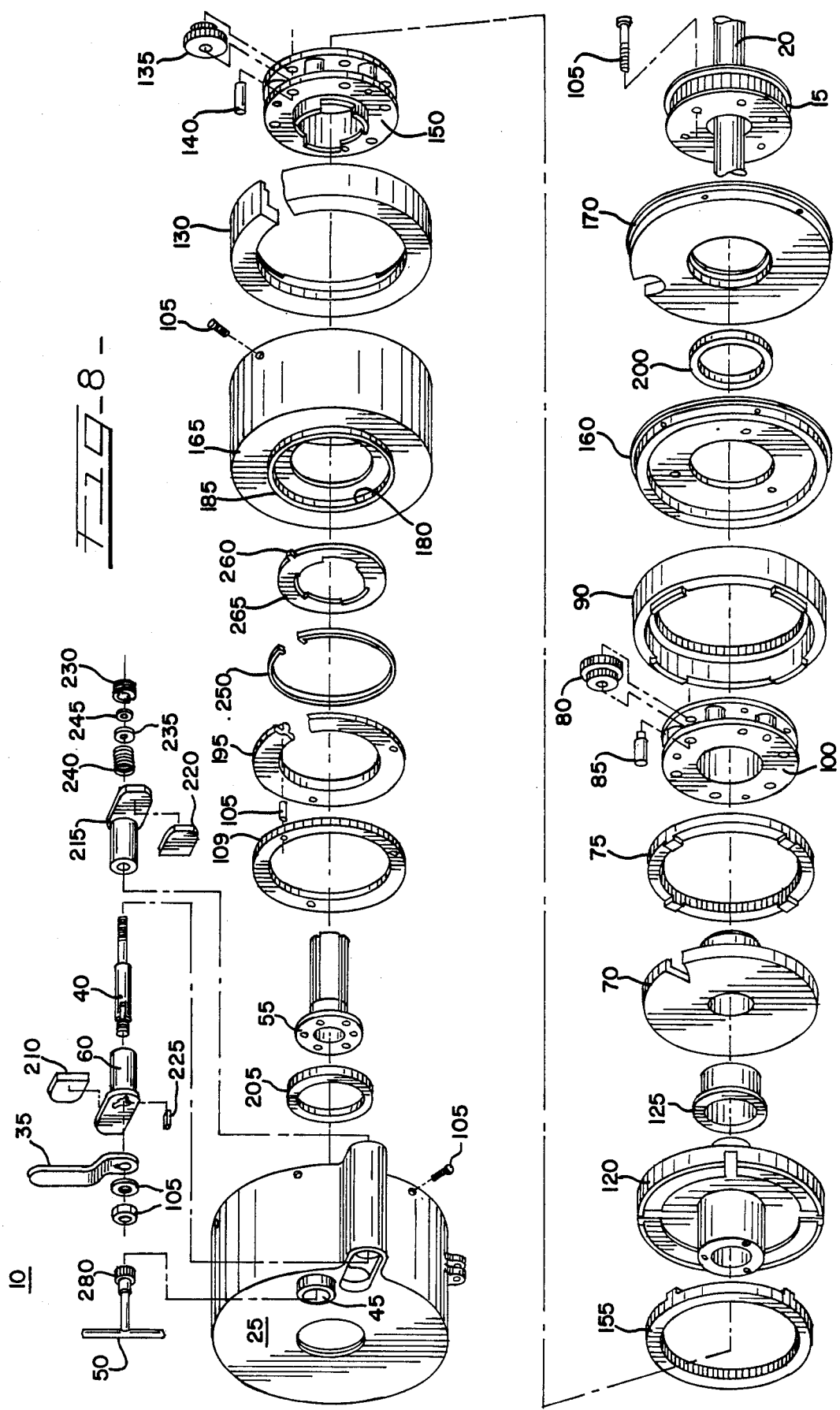

DYNAMIC PHASE ADJUSTER

This invention relates generally to machines having more than one shaft in which each must perform a function in specific relationship to each other. Specifically, it may be necessary to adjust one or more shafts angularly with respect to a single drive source to obtain the desired result.

BACKGROUND OF THE INVENTION

The present invention is useful in machines which operate packaging, printing and assembly lines in which there is more than one function or shaft to perform a function that must operate in a specific relationship to each other. Usually, such machines are driven from a single power source or motivator. The functions of such machines may be, but are not limited to, printing, slitting, cutting and sorting or inserting products into containers, gluing, trimming, opening, closing, capping bottles, embossing packages or assembling various parts on an assembly line at specific machine times. In order to perform any of these functions, it is often necessary to adjust one or more of the shafts angularly with respect to the main drive source or with respect to another function of the machine to bring the function or activity within the register of the previous or following function to obtain the desired result.

Many previous devices are limited to only a few degrees of adjustment. Prior art devices capable of adjustment through 360 degrees or more of registry are generally cumbersome, and many require additional shafts (e.g., jackshafts), or other components which make the units difficult to install, especially on existing machines. Also, many of the prior art devices have gears meshing during normal operation causing continuous wear on the phase adjuster.

U.S. Pat. No. 4,579,019 to Gabriele discloses a method and apparatus for power transmission from an engine. The transmission disclosed includes a dual planetary gear system in which a first planetary gear system drives the second planetary gear system. The invention in Gabriele is distinguishable from the present invention in that the planetary pinion gears operate singly such that the power is transmitted from the first set to the second set by means of a sun gear of the first set being integral with a planetary carrier cage of the second set. The present invention does not utilize a sun gear to transmit power from the first planetary gear set to the second.

U.S. Pat. No. 2,986,952 to Ward disclose a shaft adjusting means. Ward discloses a phase adjusting apparatus for use with a printing machine which involves a planetary gear arrangement. The present invention is easily distinguished from Ward, in that Ward lacks the dual planetary gear system in which the planetary gears are connected by an outer carrier.

U.S. Pat. No. 3,482,457 to Wallis discloses an engine, variable in both power and direction, and a simple planetary phase changing device. Wallis, as prior art, discloses a planetary gear system, but lacks a secondary planetary gear system coupled to the first by an outer carrier.

U.S. Pat. Nos. 2,536,102 to Smith and 3,563,104 to Schuster each disclose phase controllers or adjusters but each lack the present invention's specific planetary gear system.

U.S. Pat. No. 3,812,734 to Hamburger discloses an externally adjustable cam timer. Hamburger relates a phase adjusting apparatus with an external adjustment means. The adjustment structure of the present invention is easily distinguished from that of Hamburger because the phase relationship of input to output may not be adjusted while in operation.

BRIEF SUMMARY OF THE PRESENT INVENTION

The present invention is a dynamic phase adjuster having an input pulley and a coaxial output shaft. The input pulley is connected to a first planetary gear set having planetary pinion gears which are grouped in sets of two attached pinion gears per shaft and operate without the use of a sun gear. One planetary pinion gear of each set is driven by a gear attached to a hub, and the pinion gears, in turn, drive an internal gear that is connected to a carrier that drives another planetary pinion gear which drives a shaft side hub which is connected and drives the output shaft.

The second set of planetary pinion gears is of similar construction to the first set. The second planetary gear set can be rotated relative to the first set to adjust the phase of the output shaft relative to the input pulley.

It is also noted that the inputs and outputs of the present invention are interchangeable.

The present invention requires a minimum of effort to be installed on existing equipment, can be either designed into new equipment or used in a retrofit capacity. The present invention has infinite adjustability in either direction and can be operated while in motion or stopped, and while in its normal operative or rotating condition, there is no relative motion between the planetary pinion gears and the ring gears. Because the planetary pinion gears are meshed or only in contact with the ring gears but are not in relative motion or enmeshed with each other, the phase adjuster has a higher efficiency resulting in minimal wear and greater ruggedness of the overall device.

Numerous other advantages and features of the invention will become readily apparent from the following detailed description of the preferred embodiment of the invention, from the claims and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein:

FIG. 7 is a vertical sectional view of an alternative embodiment of the adjusting system of the present invention; and FIG. 8 is an exploded view of the components of the present invention of FIG. 1.

DETAILED DESCRIPTION OF THE INVENTION

Figure 1:
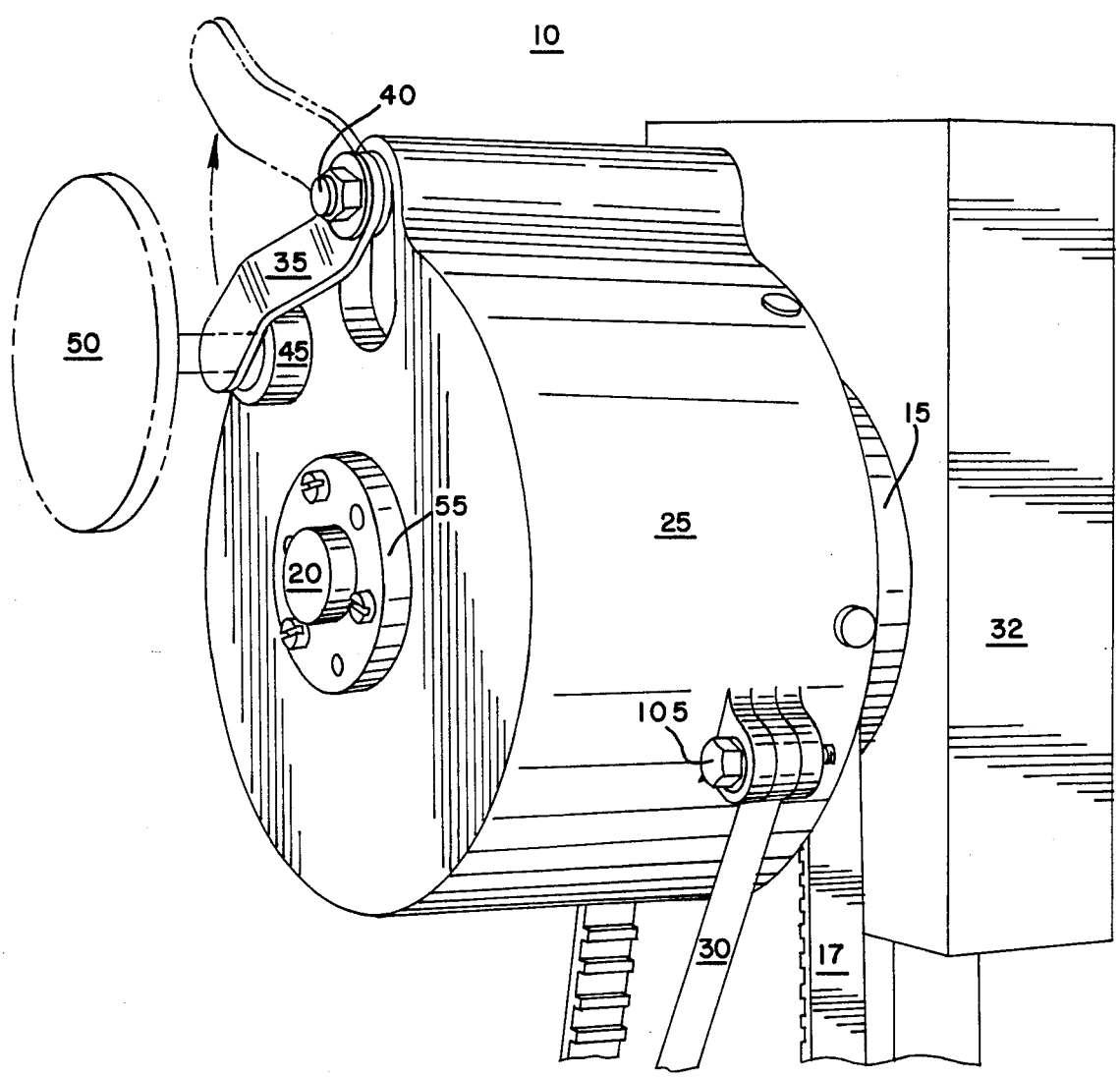
FIG. 1 is a general perspective view of the dynamic phase adjuster of the present invention.

While the invention is susceptible of embodiment in many different forms, there is shown in the drawings and will herein be described in detail a preferred embodiment of the invention. It should be understood, however, that the present disclosure is to be considered as an exemplification of the principles of the invention and is not intended to limit the spirit and scope of the invention and/or claims to the embodiment illustrated.

Referring now to FIG. 1 the dynamic phase adjuster is generally referred to by the numeral 10. The device 10 is connected to an associated conventional input component 15, shown partially as a pulley with belt 17. The end of output component 20 is shown on housing 25 coaxial with input device 15. Although the input component 15 is shown as a pulley, and the output component 20 is shown as a shaft, either input component 15 or output device 20 may be a shaft, a sprocket, a timing sprocket, a pulley gear, a coupling gear or any similar device.

For safety reasons and for ease of adjustment, the housing 25 is connected to bar 30 which is connected to an associated stationary machine member shown partial in fragment to create a mechanical ground.

The caliper brake lever 35 is rotationally positioned on brake tie rod 40. Adjuster support 45 is part of housing 25. Adjuster 50 is shown in outline form to be inserted into adjuster support 45. Expansion bushing 55 is wedged between shaft 20 and shaft side hub 120.

Figure 2:
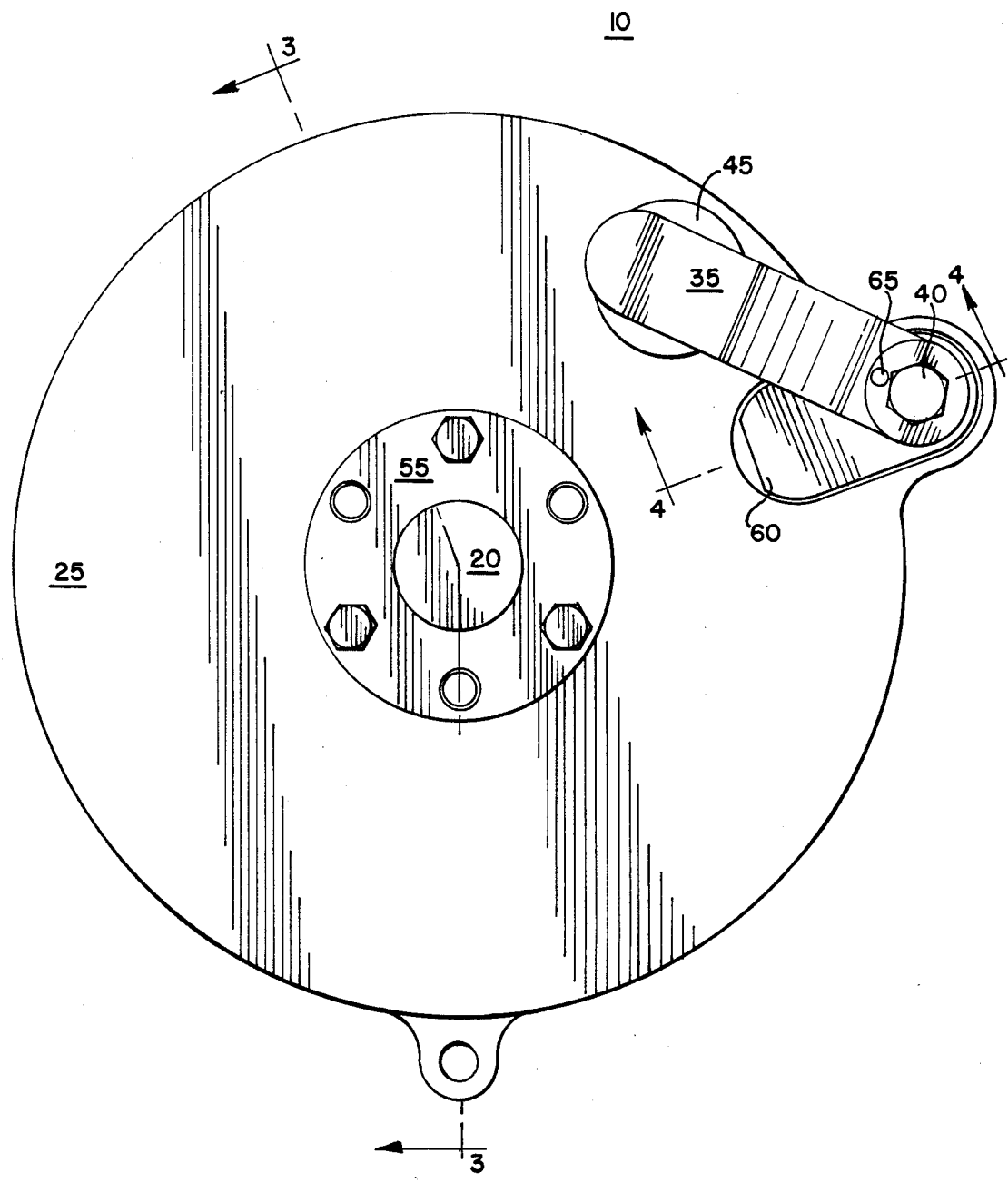
FIG. 2 is a front end view of the present invention of FIG. 1.

FIG. 2 depicts additionally a brake bracket 60 and brake cam release 65.

Figure 3:
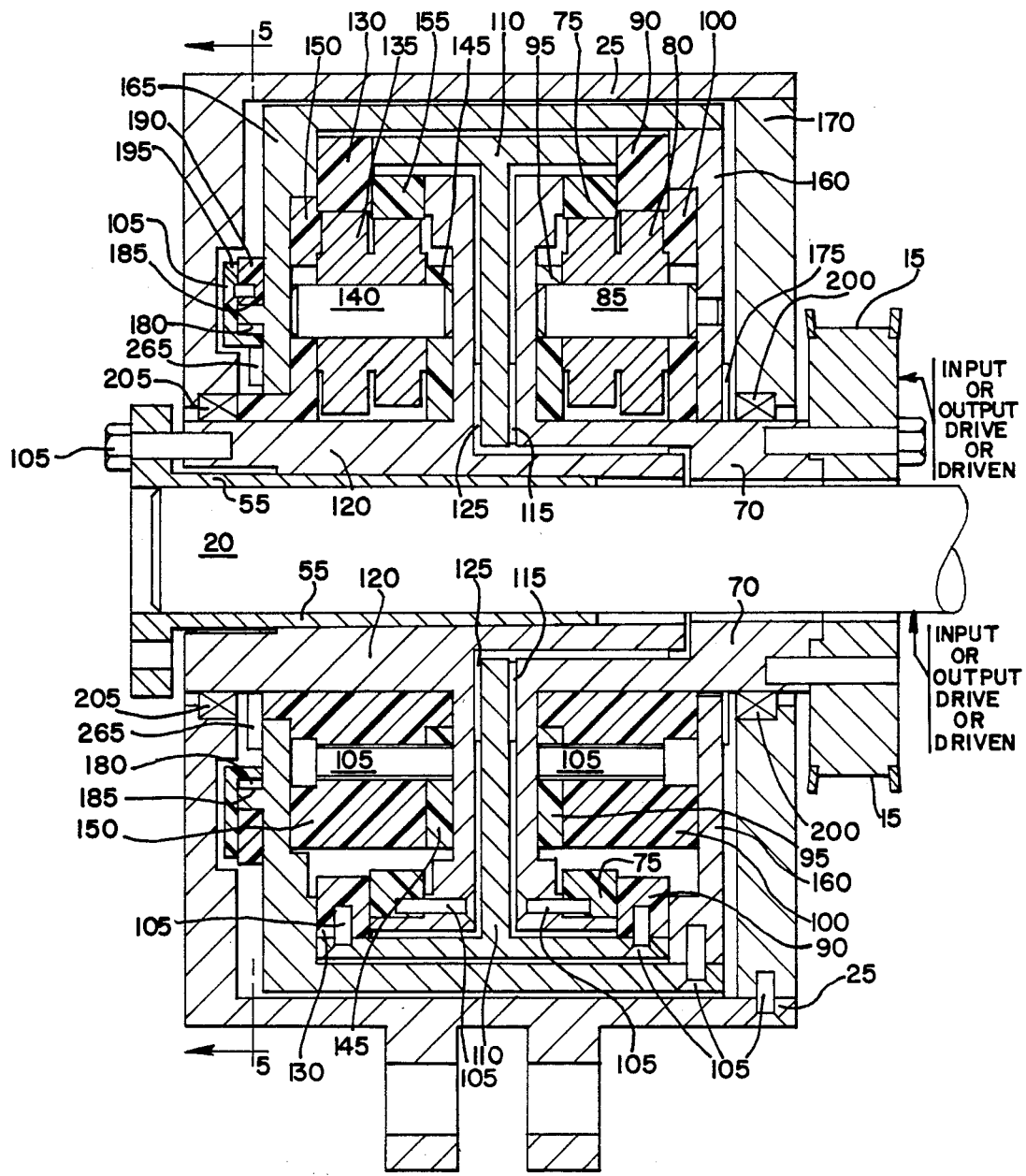
FIG. 3 is a view taken along line 3—3 of FIG. 2.

Shown in FIG. 3 is the device 10 in which input device 15 is shown affixed to pulley side hub 70 attached to inner internal gear 75. Inner internal gear 75 meshes with planetary pinions gears 80. Gears 80 are composed of two pinions having different pitch circle diameters attached together or may be intergally formed. Gears 80 are journaled to and free to rotate about pinion shaft 85. Pinion shaft 85 is carried in pinion carrier end plate 95 and pinion carrier 100 which are attached by conventional bolts or other fastening means 105. Plate 95 and pinion carrier 100 are journaled with and free to rotate about pulley side hub 70. Gears 80 mesh with outer internal gear 90. Outer internal gear 90 is attached to gear carrier 110. Gear carrier 110 is separated from hub 70 by thrust washer 115, which allows free rotation between carrier 110 and hub 70. Carrier 110 is separated from shaft side hub 120 by a flanged bearing sleeve 125. Carrier 110 is attached to internal gear 130. Gears 90 and 130 are separate but identical. Gear 130 meshes with the second set of planetary pinion gears 135. Pinion shaft 140 is carried in pinion carrier end plate 145 and pinion carrier 150 which are likewise attached by bolts or other fastening means 105. Plate 145 and carrier 150 are journaled to and free to rotate about shaft side hub 120.

Gears 135 mesh with inner internal gear 155. Inner internal gear 155 is attached to shaft side hub 120. Hub 120 is connected to output shaft 20 by forcing expansion bushing 55 between hub 120 and shaft 20, with shaft 20 rotatably disposed within bushing 55.

Pinion shaft 85 is rotatably connected to inner housing end plate 160 which is journaled to and free to rotate about hub 70 and is separated from outer housing end plate 170 by thrust washer 175. Plate 160 is attached to inner housing 165 by fastener pin 105. Housing 165 is journaled to and free to rotate about pinion carrier 150. Formed as part of or affixed to housing 165 is internal brake drum 180 and journal 185. Free to rotate on journal 185 is adjusting gear 190. Attached to the adjusting gear 190 is adjusting drive plate 195 which is fastened by fastener pin 105.

Outer housing end plate 170 is journaled to hub 70 by bearing 200. Plate 170 is attached to housing 25 by fastener pin 105. Housing 25 is journaled to hub 120 by bearing 205.

Figure 4:
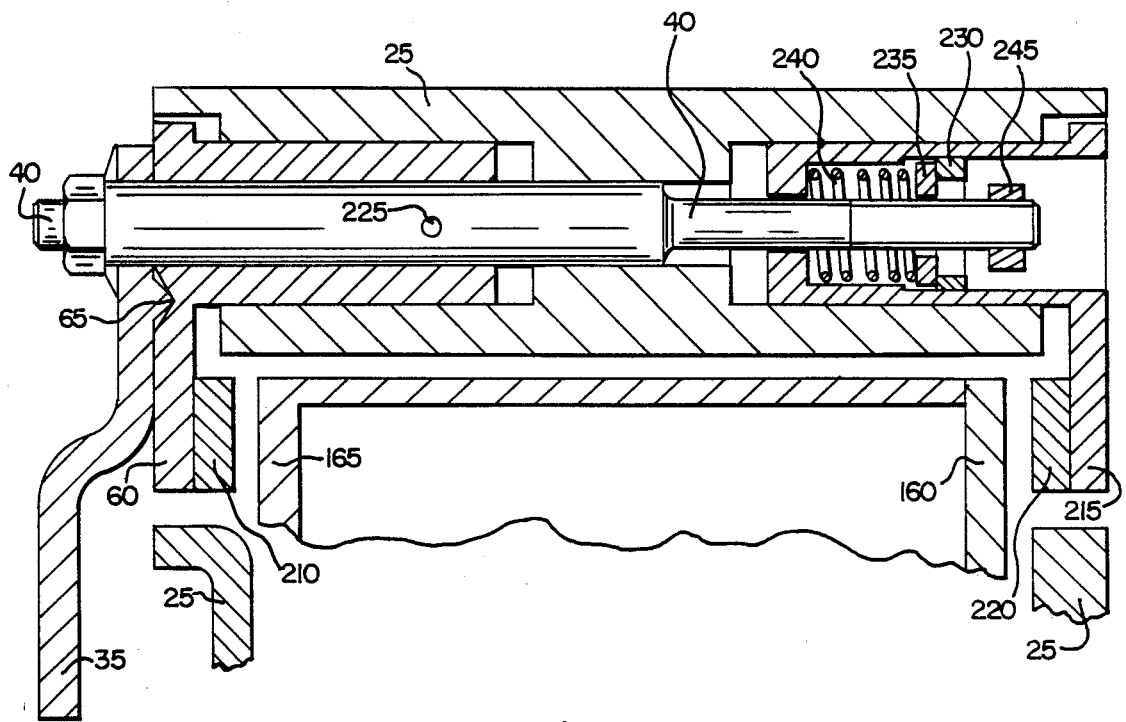
FIG. 4 is a view taken along line 4—4 of FIG. 2.

Shown in FIG. 4, the surfaces of inner housing 165 and inner housing end plate 160 act as brake disks. Attached to brake bracket 60 is brake pad 210. Brake pad 220 is attached to brake bracket 215. Through brake tie rod 40 is pin 225 which fits into keyed slot (not shown) in brake bracket 60. Brake bracket 215 fits over brake tie rod 40. Threaded to brake bracket 215 is adjusting thimble 230. Between adjusting thimble 230 and the bottom of the counter bore of brake bracket 215 is a washer 235 and a spring 240. Attached to the end of brake tie rod 40 is an adjusting thimble 245.

Figure 5:
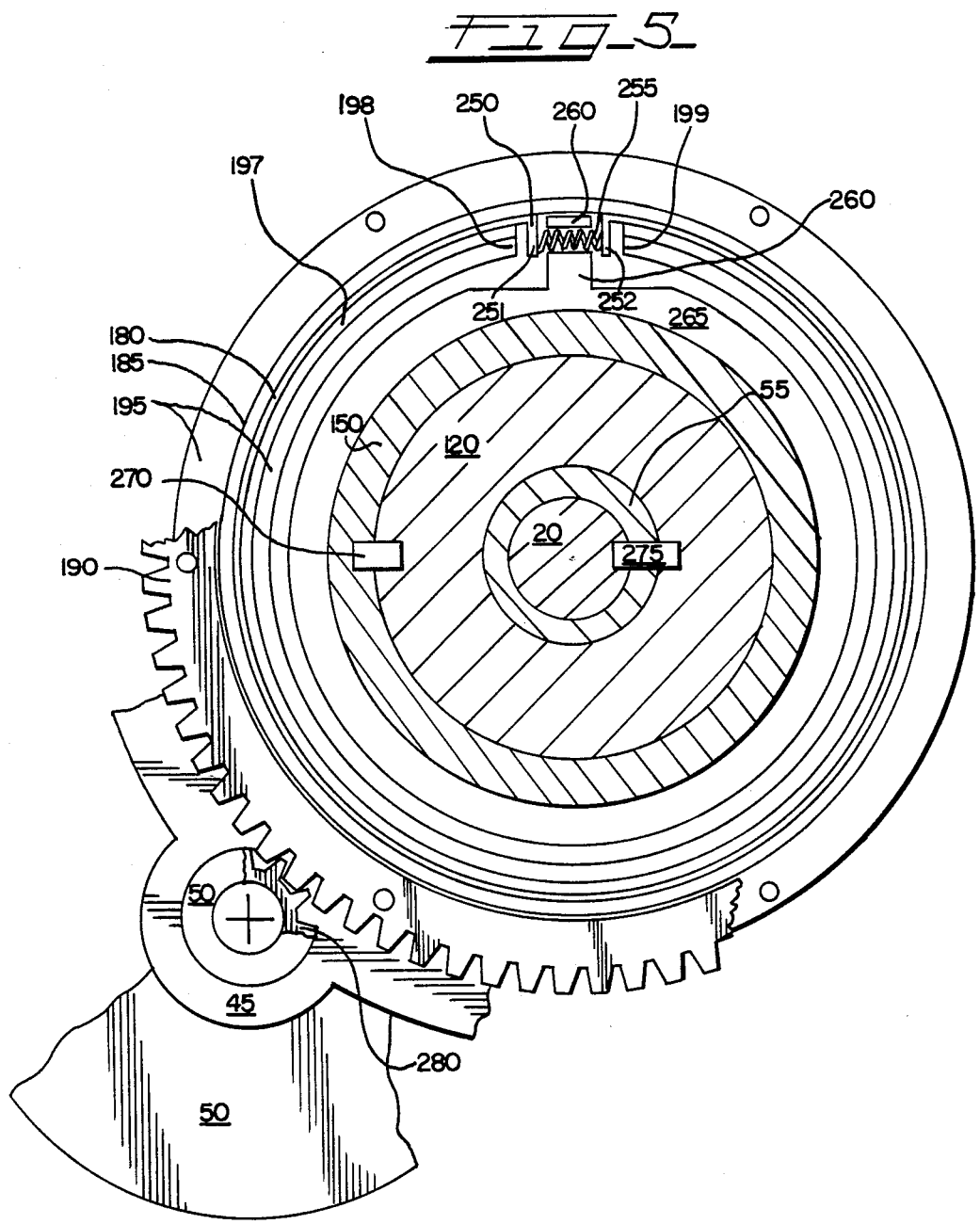
FIG. 5 is a partial sectional view along lines 5—5 of FIG. 3.

Shown additionally, in FIG. 5 is brake band 250 which rides on internal brake drum 180. Brake band 250 is outwardly biased by spring 255. Between the ends of brake band 250 is tang 260 of tang plate 265. Tang plate 265 is attached to pinion carrier 150 by a key 270 or other conventional method of interlock. Key 275 extends from hub 120 through bushing 55 into shaft 20 as shown. Gear 280 is affixed to adjuster 50. When adjuster 50 is inserted into adjuster support 45, gear 280 is meshed with or in contact with adjusting gear 190.

Shown in FIG. 7 as an alternative embodiment of the followup brake, depicting additionally brake band release 285.

FIG. 8 is exploded component representation of the device 10 as described above. However, not shown is gear carrier 110, thrust washer 115, pinion carrier end plates 95, 145, thrust washer 175, spring 225, keys 270, 275, and brake band release 285.

Briefly, the overall purpose of the present invention, as exemplified by the preferred embodiment, is to take rotational motion and apply it to device 10 at input component 15 so that the angular relationship of the motion from output shaft 20 can be varied with respect to the motion at input component 15. This angular relationship is adjusted by the manual insertion and rotation of adjuster 50 into adjuster support 45.

The gearing of the device 10 is arranged such that the gear system described will carry the vast majority of the torque through the planetary pinion and internal gears. The minor percentage of the torque reacts through the pinion pins into the pinion carriers. The connection between the two pinion carriers is through a controlled brake mechanism, such that, by moving one pinion carrier with respect to the other, the angular position from input to output of the device is varied. The arrangement of gear reduction or increase on the input side of the device, is the opposite reduction or increase on the output side such that the resultant overall gear reduction from input to output is 1 to 1.

Described below are three characteristics of torque transfer of the present invention:

A. Main Torque Transfer

Figure 6:
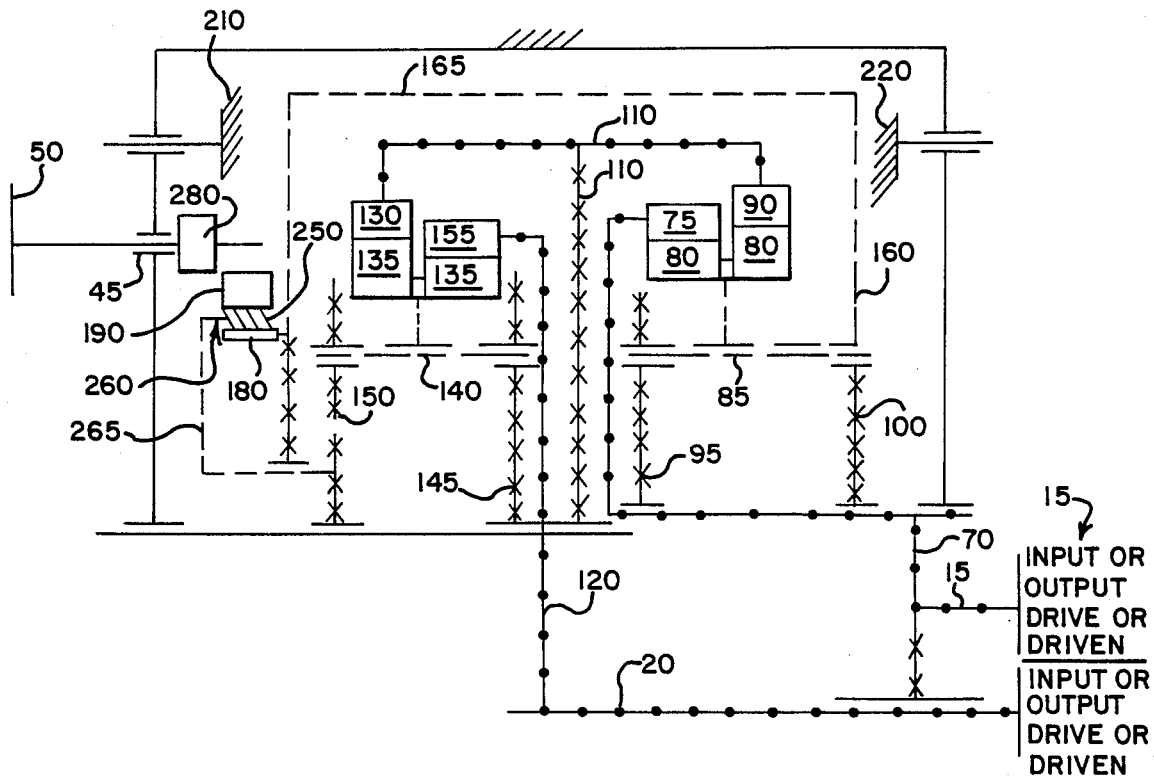
FIG. 6 is a schematic diagram of the operation of the present invention of FIG. 1.

In FIGS. 3 and 6, in which FIG. 6 is a schematic diagram showing the energy through input (not all components are shown in FIG. 6) of the device 10, the main torque transfer is described as follows.

Input torque is applied to input component 15 which is transferred to pulley side hub 70 which in turn is transferred to inner internal gear 75. Gear 75 transfers torque energy to planetary pinion gears 80, which in turn transfer torque to outer internal gear 90. The torque from gear 90 is transferred through gear carrier 110 to internal gear 130. Internal gear 130 transmits torque to planetary pinion gear 135 which in turn transmits torque to inner internal gear 155. Internal gear 155 transmits torque to shaft side hub 120 which is connected to output shaft 20 by the use of expansion bushing 55. Output shaft 20 provides the desired torque for use in the desired machine application.

B. Minor Torque Transfer

Referring again to FIG. 6, the torque on planetary pinion gears 80 reacts through pinion shafts 85 to pinion carrier 100 and pinion carrier end plate 95. The torque from pinion shaft 85 is also transmitted to inner housing end plate 160 and inner housing 165 which controls the pinion carrier 100. The torque from housing 165 is transferred through internal brake drum 180 to brake band 250. The brake band 250 as shown in FIG. 5, (or in the alternative brake embodiment shown in FIG. 7) is arranged with spring 255 positioned between the ends of band 250, such that when the torque is transmitted through internal brake drum 180, band 250 and to tang 260, no relative motion between the band 250 and the brake drum 180 occurs. This is because the pressure through the tang 260 to the band 250 tends to increase the braking pressure instead of releasing the braking pressure.

The torque from brake band 250 is transferred into tang 260 as part of tang plate 265 which controls pinion carrier 150. Pinion carrier 150 carries the reaction torque of pinion gears 135 that is transferred through pinion shafts 140. By altering the angular relationship of pinion carrier 150 with respect to pinion carrier 100, an angular relationship between input component 15 and output shaft 20 occurs.

C. Adjusting The Angular Relationship

To adjust the angular relationship between input component 15 and output shaft 20, inner housing 165 and inner housing end plate 160 must be prevented from rotating. As shown in FIG. 4, the inner housing 165 and plate 160 are stopped from rotating by moving the caliper brake lever 35, as shown in outline form in FIG. 1. The rotational movement of lever 35 causes brake cam release 65 to move out of its indent, pulling brake tie rod 40 towards the lever side of housing 25 and brake bracket 60 is pushed away from the lever side of housing 25. Brake tie rod 40 also pulls thimble 245 through adjusting thimble 230 and pulls against washer 235 compressing spring 240, thus pulling brake bracket 215 towards the lever side of housing 25. Brake bracket 60 with brake pad 210 attached, approaches brake bracket 215 with brake pad 220 attached and is in contact with housing 165 and end plate 160. This action creates friction from brake pads 210, 220 being held against housing 165 and end plate 160. This causes pinion gears 80, inner internal gear 75, outer internal gear 90 to rotate relative to each other, and causes pinion gear 135, outer internal gear 130 and inner internal gear 155 to rotate relative to each other and also causes pinion carrier 100, end plate 95, pinion carrier 150, and end plate 145 to become stationary.

The adjuster 50 with attached gear 280 is inserted into adjuster support 45 as shown in FIG. 5. Gear 280 engages adjusting gear 190 which is connected to adjusting gear drive plate 195.

The adjusting gear drive plate 195 includes an internal ring 197 which is arranged to fit over the dabbed ends 251, 252 of brake band 250. When changing the angular relationship of device 10, adjuster 50 is rotated which rotates gear 280 and in turn rotates adjusting gear 190, moving one of two ends 198, 199 of the internal ring 197 of adjusting plate 195 against the effected end 251 or 252 of brake band 250. The resulting pressure against the ends of brake band 250, pulls the brake band 250 away from the internal brake drum 180 and additionally moves the tang 260, tang plate 265 and pinion carrier 150. Since inner housing 165, end plate 160 and pinion carrier 100 are held stationary by brake pads 210, 220, this movement of the pinion carrier 150 changes the angular relationship between pinion carrier 100 and pinion carrier 150, resulting in a change in the relative angular relationship between the input and output components 15, 20 of the device 10 relationship of the device 10 to be altered.

Besides the embodiment shown in the drawings and described above, it is envisioned that the present invention may take advantage of the following features. To reduce the number of components, high strength, low friction, lubricant-free materials may be used such as material known by the trademark Torlon, which is manufactured by the Amoco Chemical Co. However, conventional materials may also be used with success.

Additionally, by the application of conventional electrical control means including computers, the alteration of the angular relationship of the present invention may be automatically accomplished.

While the foregoing has presented certain specific embodiments of the present invention, it is to be understood that these embodiments have been presented by way of example only. It is expected that others will perceive differences which, while bearing from the foregoing, do not depart from the spirit and scope of the invention herein described and claimed.

What is claimed:

1. A device for selectively altering the angular relationship of respectively rotating components, comprising:
    an outer housing;
    an inner housing disposed within said outer housing for coaxial rotation therein and having gearing means therein;
    rotational input component means engaging said gearing means in said inner housing through said outer housing;
    rotational output component means engaging said gearing means in said inner housing through said outer housing at an angular position relative to said rotational energy input means;
    braking means for braking the rotation of said inner housing relative to said outer housing; and
    adjustment means for adjusting the angular position of said input component relative to said output component while said inner housing is braked by said braking means.

2. The device as defined in claim 1 wherein said gearing means include a hub gear connected to said input component means, a first set of planetary gears engaging said hub gear as well as an energy transfer means, a second set of planetary gears engaging said energy transfer means as well as said output component means.

3. The device as defined in claim 2, wherein each of said first and second planetary gear sets includes first and second pinion gears coaxially fixed together.

4. The device as defined in claim 1 wherein said rotational input component means is a pulley.

5. The device as defined in claim 1 wherein said rotational output component means is a shaft.

6. The device as defined in claim 5 wherein said shaft is coaxial with said input component means.

7. The device as defined in claim 1 wherein said braking means includes a brake assembly with biased, opposing brake pads, said pads being frictionally engageable with opposite sides of said inner housing.

8. The device as defined in claim 7 wherein upon the engagement of said braking means with said inner housing, said gearing means is adapted to rotate independently of said inner housing to maintain the rotation of said input and output component means.

9. The device as defined in claim 1 wherein said adjustment means includes a brake drum being attached to said inner housing, a brake band biased against said brake drum, an adjusting gear having an adjusting drive plate and being attached to said brake drum for releasing the bias of said brake band against said brake drum to adjust the position of said input component means relative to said output component means.

10. The device as defined in claim 9 further including a tang plate connected to a portion of said gearing means and engageable by said adjusting drive plate which, upon the release of said brake band, permits a specified degree of adjustment of the relative angular position of said input and output component means.

11. The device as defined in claim 1 wherein said device is fabricated of high strength, low friction, lubricant-free material.

12. The device as defined in claim 11 wherein said material is Torlon brand material.

13. A device for selectively altering the angular relationship of respectively rotating components, comprising:
an outer housing;
an inner housing disposed within said outer housing for coaxial rotation therein;
rotational energy input means disposed at one end of said outer housing;
hub gear means located within said inner housin and being driven by said energy input means;
a first planetary gear set located within said inner housing and having first and second pinion gears coaxially fixed together, said first pinion gear being drivable by said hub gear means;
energy transfer means located within said inner housing and being drivable by said second pinion gear;
a second planetary gear set located within said inner housing and having first and second pinion gears coaxially fixed together, the first of said pinion gears of said second set being drivable by said energy transfer means;
rotational energy output means disposed at an opposite end of said outer housing from said input energy means and being drivable by said second pinion gear of said secondary planetary gear set;
said inner housing, said hub gear means, said first and second planetary gear sets and said energy transfer means being rotatable as a unit coaxially within said outer housing;
means for braking the rotation of said inner housing relative to said outer housing; and
means for adjusting the angular position of said input means relative to said rotational energy output means while said inner housing is braked from rotational movement.

14. The device as defined in claim 13 wherein said rotational input component means is a pulley.

15. The device as defined in claim 13 wherein said energy transfer means is a gear carrier.

16. The device as defined in claim 13 wherein said rotational output component means is a shaft.

17. The device as defined in claim 13 wherin said braking means includes a manually actuated brake assembly having spring biased brake pads located adjacent opposite sides of said inner housing.

18. The device as defined in claim 13 wherein said adjustment means includes a brake drum attached to said inner housing, a brake band biased against said brake drum, an adjusting gear having an adjusting drive plate and attached to said brake drum, and an adjuster tool having a pinion gear at one end engageable with said adjusting gear.

19. The device as defined in claim 18 further including a tang plate connected by a gear carrier to said second planetary gear set and having a tang normally biased against said brake band.

20. The device as defined in claim 19 wherein said adjusting gear, in releasing said brake band, also releases the bias of said tang to permit relative angular adjustment of said input component to said output component.

* * * * *

UNITED STATES PATENT AND TRADEMARK OFFICE
CERTIFICATE OF CORRECTION

PATENT NO. : 4,922,790

DATED : May 8, 1990

INVENTOR(S) : Abbott et al.

It is certified that error appears in the above-identified patent and that said Letters Patent is hereby corrected as shown below:

Column 3, line 20, change "device" to --component--;

Column 6, line 6, change "dabbed" to --tabbed--;

Column 6, line 12, change "the effected end" to --one of the effected end 251 or 252--;

Column 6, line 13, change "251 or 252" to --effected end 251 or 252--;

Column 6, line 66, change "include" to --includes--;

Signed and Sealed this

Twenty-fourth Day of September, 1991

Attest:

HARRY F. MANBECK. JR.

*Attesting Officer*      *Commissioner of Patents and Trademarks*